United States Patent [19]
Graznak

[11] 3,870,076
[45] Mar. 11, 1975

[54] AUTOMATIC LIQUID MEDICAMENT MIXER FOR TREATING ANIMALS

[75] Inventor: Charles Graznak, Platteville, Colo.

[73] Assignee: Dacmont, Inc., Platteville, Colo.

[22] Filed: Mar. 26, 1973

[21] Appl. No.: 345,464

[52] U.S. Cl................. 137/607, 137/3, 137/389, 137/411, 137/571
[51] Int. Cl............................................. F16k 19/00
[58] Field of Search ....... 137/3, 88, 101.25, 101.27, 137/389, 411, 552.7, 571, 606, 607, 572

[56] References Cited
UNITED STATES PATENTS

| | | | |
|---|---|---|---|
| 964,833 | 7/1910 | Yates | 137/411 X |
| 1,037,135 | 8/1912 | Tomlinson et al. | 137/411 |
| 1,058,238 | 4/1913 | Hixon | 137/411 X |
| 2,424,163 | 7/1947 | Hammer | 137/411 UX |
| 3,131,707 | 5/1964 | Cordis | 137/99 |
| 3,498,311 | 3/1970 | Hawes | 137/101.25 |
| 3,545,469 | 12/1970 | Cissell | 137/101.27 |
| 3,770,198 | 11/1973 | Mihara | 137/93 UX |

*Primary Examiner*—Alan Cohan
*Assistant Examiner*—Gerald A. Michalsky
*Attorney, Agent, or Firm*—Richard D. Law

[57] ABSTRACT

A device for accurately proportioning and mixing a liquid medicament or the like into drinking water for animals includes a reservoir in which the medicament and water are mixed, a water inlet supply capable of being adjusted to a desired predetermined flow rate, and a pumping arrangement for continuously injecting a predetermined flow rate of medicament into the reservoir container. A control device is arranged for initiating the water and medicament flow automatically as the demand for drinking water exists. A pre-set timing device is incorporated in the medicament flow circuit to permit cyclic feeding of the medicament to the water, if required. An elapsed time indicator in the water circuit permits calculation of the total quantity of water used.

4 Claims, 5 Drawing Figures

PATENTED MAR 11 1975
3,870,076
SHEET 1 OF 2
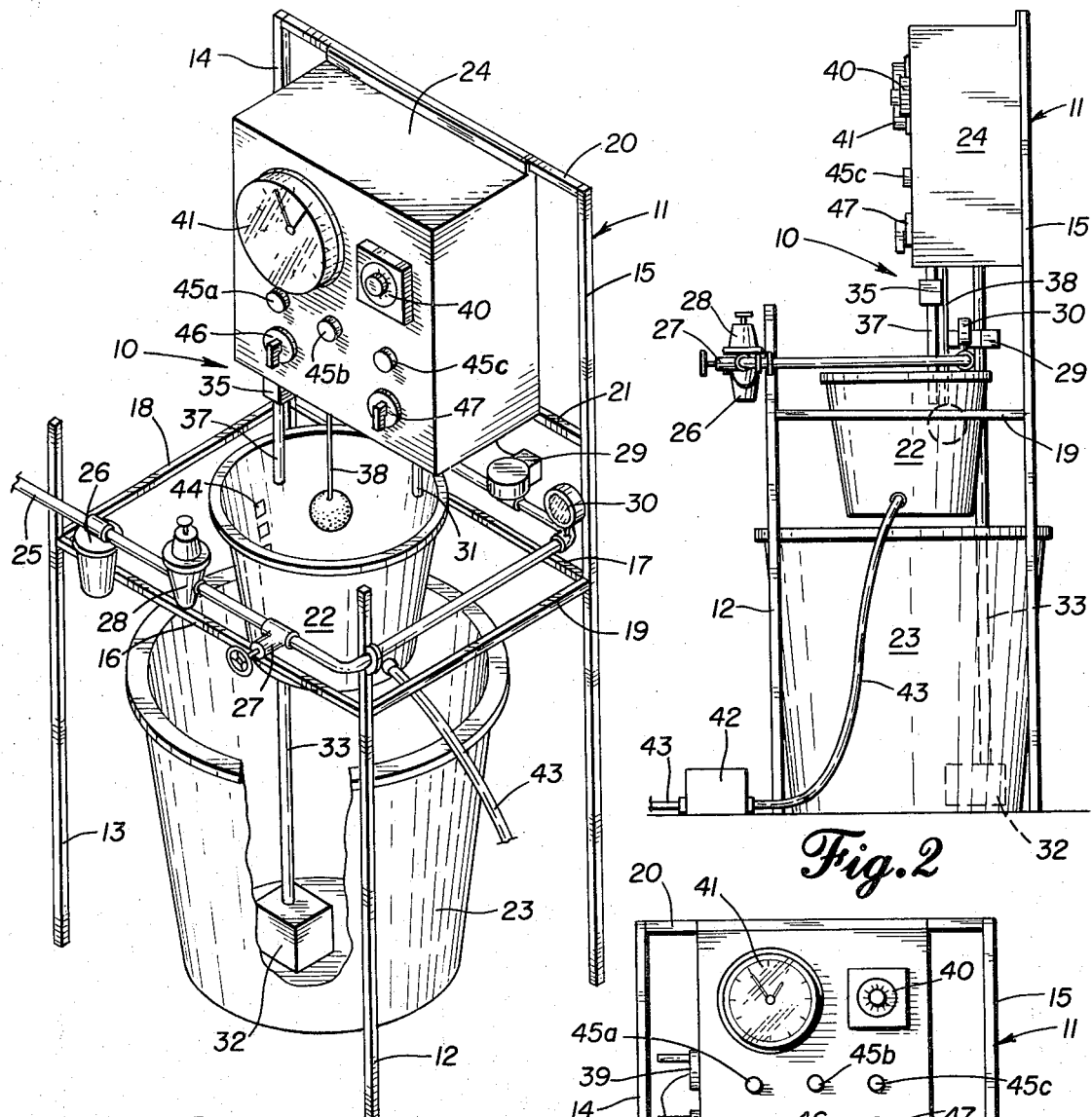
Fig.1
Fig.2
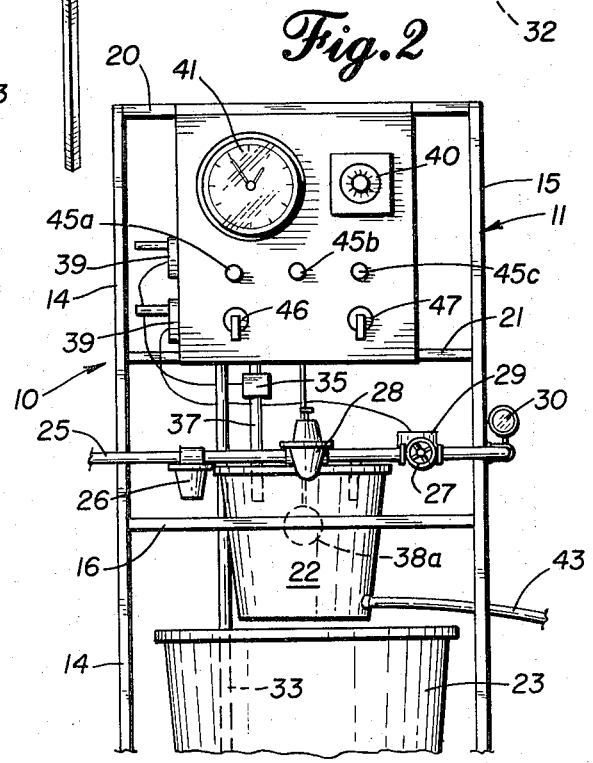
Fig.3

AUTOMATIC LIQUID MEDICAMENT MIXER FOR TREATING ANIMALS

This invention is directed to a device for automatically treating animals by the injection of medicament into the animal drinking water supply. It is more specifically directed to a device that accurately proportions and mixes a medicament or additive and water whenever the demand for drinking water exists.

In the past, devices have been designed for medically treating and feeding animals. Many of these devices inject the medicine or additive directly into the line for the watering troughs or pans for the animals, but a major problem lies in accurately proportioning the medicine with respect to the quantity of water used so as to obtain a solution of proper strength. An additional problem is encountered when it is necessary to treat the animals periodically over an extended time period. This periodic treatment operation is usually necessitated by the type of additive that is to be supplied and the type of disease or malady that is being treated. The prior devices, in addition, have the deficiency that, as an attempt is made to improve the accuracy of the solution strength, the flow capacity is greatly reduced.

The more recent devices have attempted to overcome these deficiencies but have proven to be either cumbersome or inaccurate. One proposed answer to the problem, as described in U.S. Pat. No. 3,545,469, provides an operation, commonly called batching, wherein a quantity of the medicine concentrate solution is periodically dumped into a larger known quantity of the water. This type of operation necessitates an intermittent flow or supply of drinking water in that the delivery of prepared drinking solution must be stopped while the container is refilled with water to obtain the proper proportion of water and medicament. Continuous delivery of the prepared drinking water is impossible with this type of device.

Another mixing device shown in U.S. Pat. No. 3,131,707 discloses an arrangement similar to the batching type operation where the water and medicament are mixed in a closed cylinder. A water powered proportioning system operates a piston motor with the exhaust water from the piston being metered into a closed chamber with a quantity of medicament solution. A piston operation of this nature, in effect, provides a pulsating stream which reduces the delivery capacity of the device.

It is, therefore, an object of the present invention to provide a simple medicament mixing apparatus which can be readily assembled from common, easily available components. An arrangement of this nature inherently provides an inexpensive and easily maintained apparatus which is readily adapted to field use.

Another object of this invention is to provide a device which continuously provides an adequate supply of drinking water which may be accurately mixed with the desired quantity of medicament.

A further object of this invention is to provide a device which can be used to inject medicament periodically and automatically into the drinking water to obtain cyclic feeding of the treated solution to the animals.

In general, the present invention provides a mixing or reservoir container in which the water and liquid medicament or additive solution are continuously mixed. A water supply line having a pressure regulator for maintaining constant flow in the system is fed through a solenoid controlled shut-off valve to the reservoir container. A prepared solution of the medicament is maintained in a separate container. The medicament solution is circulated at constant pressure from a storage container through an individual metering valve and a solenoid controlled shut-off valve to properly control the injection of the medicament solution into the mixing reservoir.

An arrangement is provided whereby the medicament pump may be operated continuously, if necessary, so as to recirculate the solution in the storage container to maintain any insoluble particles in suspension.

The flow rate of both the water and medicament solution can be accurately adjusted and calibrated for the desired concentration of the particular type additive to be used, so that a continuous flow of water and/or solution into the mixing chamber provides the desired concentration of delivered treating solution and/or water.

Float operated valves in individual animal watering troughs can be used to actuate a delivery pump when the demand for water exists. It is, also, possible that a pressure sensing device can be provided in the water delivery network so that, as a float valve is opened, the reduction in delivery system pressure can cause the actuation of the delivery pump.

Withdrawal of the treated solution from the mixing container below a predetermined level actuates a level control device which causes the opening of the water and medicament solution valves simultaneously to introduce the flow streams into the container. The streams are introduced in directions which will cause direct impingement on each other, so that complete mixing of the solutions will take place in the chamber for delivery. For maximum mixing, the stream flow directions can be arranged in a counterflow arrangement.

A pre-set timing device capable of establishing cyclic or predetermined on and off periods can be provided for control of the medicament solution flow. Thus, untreated water can be supplied as needed, with the injection of medicament to the water supply provided only at periodic predetermined time periods. This type of operation is sometimes dictated by the type of medicine or additive being used and the type of treatment being provided.

It is intended that any type of materials, such as black iron, galvanized steel, copper, or plastic type pipe and fittings, can be used throughout the liquid network. It is desirable, however, that non-corrosive type materials, such as polyvinyl chloride (PVC) and the like, be used in the medicament network to reduce the necessity for maintenance and upkeep to a minimum when using corrosive type additive solutions.

Other features of this invention will appear in the following description and appended claims, reference being made to the accompanying drawings forming a part of the specification, wherein like reference characters designate corresponding parts in the several views.

FIG. 1 is a diagrammatic perspective view of one form of the mixing apparatus of this invention;

FIG. 2 is a side elevational view of the apparatus shown in FIG. 1;

FIG. 3 is an enlarged partial front view showing the relative position of the individual components of the mixing apparatus;

Figure 4:
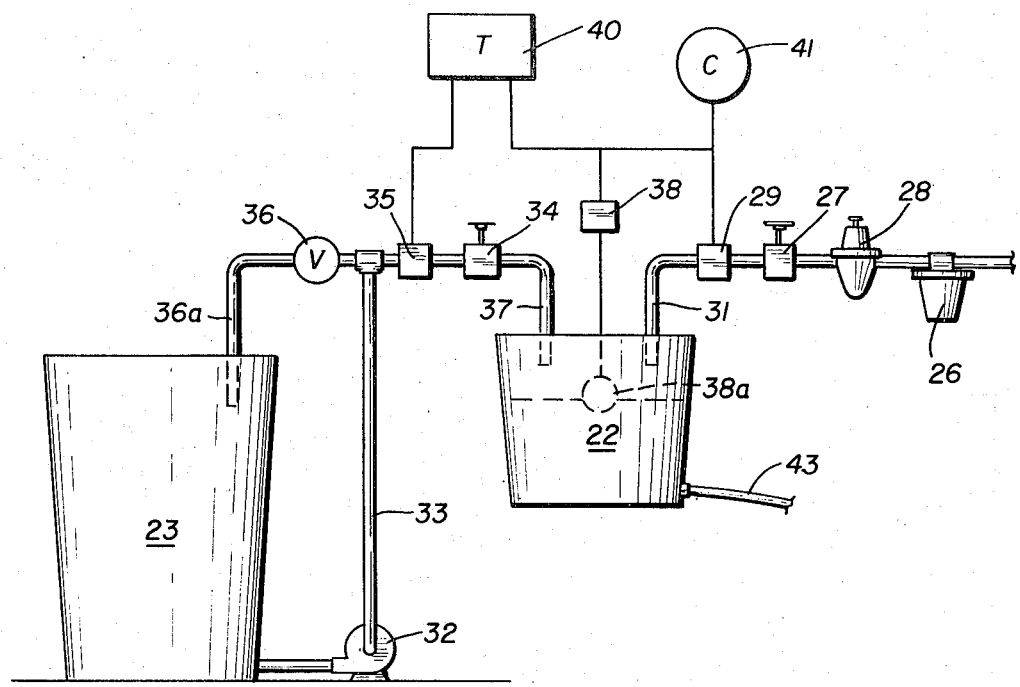
FIG. 4 is a schematic diagram of the liquid flow paths within the apparatus.

Referring more specifically to the drawings, FIG. 1 shows a liquid medicament mixing apparatus 10 according to the present invention, having a framework consisting of upright support legs 12–15 and cross bracing members 16–21. A reservoir-mixing chamber 22 is supported by the cross members 16, 17 in a centered, suspended position above a storage container 23 for retention of the prepared medicament solution. A control box 24 is mounted on the rear upright legs 14, 15 and cross members 20, 21. The control box 24 is positioned so as to be suspended above the reservoir- mixing chamber 22. A water inlet pipe 25, as shown on the left side of FIG. 1, is supported along the front cross member 16 and is routed towards the rear of the apparatus and over the reservoir-mixing chamber 22. A strainer or filter device 26 and a manual valve 27 is provided in series in the water inlet pipe 25. A pressure regulating vlave 28 and flow control or solenoid valve 29 are, also, provided downstream of the valve 27 to maintain a predetermined flow rate of water to the reservoir container 22. If desired, a pressure gauge 30 may be provided in the line to facilitate adjustment of the pressure regulator 28. The solenoid controlled shut-off valve 29 is located immediately upstream of the water outlet nozzle 31, to provide a shut-off control when water is not required.

A medicament circulating pump 32, having an outlet or discharge pipe 33, is postioned in the bottom of the medicament storage container 23, for injecting the prepared medicament solution into the reservoir-mixing chamber 22.

In the present embodiment, a submersible type pump is shown, but it is to be understood that any type of pump may be used, such as an external pump connected to the bottom of the storage container, etc.

The pump outlet pipe 33 extends upwardly past the reservoir-mixing container 22 and is suspended from the control box 24 or framework. The pipe extends outwardly and over the reservoir-mixing container 22, ending in an outlet nozzle 37. A flow control valve 34, such as a needle valve, not shown, and a solenoid shut-off valve 35 are provided in series in the outlet pipe 33.

A pressure relief valve 36 with a return line 36a to the storage container 23, shown in the schematic of FiG. 4, is also provided in the pump outlet pipe 33. The pressure setting of the relief valve 36 is set so that a circulating flow will return to the storage container 23. In this arrangement, the medicament solution recirculates for the purpose of maintaining a uniform pressure in the medicament feed line and, also, maintain any insoluble particles in suspension simply by continuously running the medicament pump 32 to circulate and mix the prepared solution.

It is highly desirable in an apparatus such as this to be able to accurately calibrate and control the medicament solution being injected into the mixing reservoir 22. This accuracy may be accomplished by providing a constant pressure type pump, such as a positive displacement type or a centrifugal pump used in combination with the pressure relief valve mentioned above. With a constant pressure maintained in the pump outlet pipe 33, an accurate predetermined flow rate through the metering valve 34 can be maintained. Actual on-off flow in the medicament system is controlled by the electrically operated solenoid shut-off valve 35.

In order to obtain complete and instantaneous mixing of the solution within the mixing reservoir 22, the medicament outlet nozzle 37 and the water nozzle 31 can be arranged so as to impinge upon each other, preferably in a counter direction within the reservoir-mixing chamber 22. In this arrangement, the two solutions are mixed continuously prior to being delivered through the outlet pipe 43.

A diagrammatic presentation of the medicament and water flow circuit is shown in FIG. 4. A clock or elapsed time indicator 41 is shown in the control circuit to the water solenoid shut-off valve. A preset timing device 40 can be utilized in the control circuitry for the medicament solenoid shut-off valve 35 to provide cyclic treating, if desired.

In order to automatically control the operation of the medicament mixing apparatus, electrical control circuitry is provided within the control box 24. A source of power is connected to the box at inlet plug 48. For the purpose of illustration, the present apparatus is designed for use with 110 volt A.C. current, although it is possible by using the components of the proper electrical design to use any current source which is commonly available, such as 12 volt D.C. or 240 volt A.C. A float control switch 38 and float 38a are suspended from the control box 24 and positioned with the float 38a at the desired liquid level in the mixing chamber 22. The position of the float 38a within the chamber 22 can be adjusted to maintain any desired liquid level within the chamber.

For ease in maintenance and adaptability to change operation of the apparatus, all the electrical components external to the control box 24, such as the solenoid shut-off valves 29 and 35 and the medicament pump 32, are connected electrically to the control box 24 by means of conventional electrical plugs or connectors and duplex receptacles 39. (See FIG. 5.) The plurality of receptacles 39 can be mounted on the side of the control box 24. The individual external electrical components are individually conected to the respective receptacle desired for the particular mode of operation. By merely removing and reconnecting the various connectors for the valves and pump, various modes of operation for the apparatus can be provided.

Figure 5:
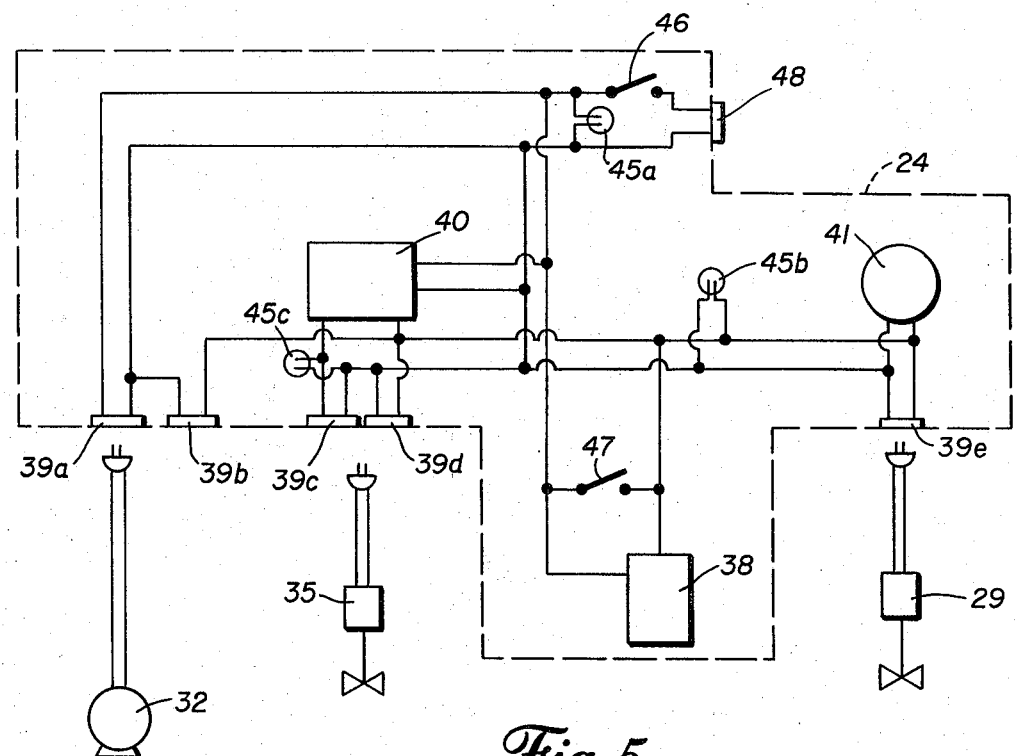
FIG. 5 is a schematic diagram of the electrical control circuit for the apparatus of the invention.

As shown in FIG. 5, the power input is controlled by master switch 46 which, in turn, energizes indicator light 45a The power input circuit splits into tow lines, one line going to the duplex receptacle 39a, which is provided for continuous operation of the medicament pump 32. The other line is connected to the timer 40 and to the float control switch 38. Power from the float control switch 38 is fed to an indicator light 45b to the elapsed time indicating clock 41 and duplex receptacle 39e, provided for connection to the water solenoid shut-off valve 29. In addition, this power is directed to receptacle 39d, provided for operation of the medicament solenoid shut-off valve 35. A branch of this circuit also passes through the preset timing device 40 and then to an indicator light 45c and duplex receptacle 39c. The receptacle 39c is not only controlled by the float control switch 38, but by the preset timer 40, so that cyclic treatment of the drinking water can be provided. A branch of the power from the float control switch 38 also is provided to receptacle 39d, provided for the intermittent operation of the medicament pump 32.

A switch 47 for testing purposes is provided for bypassing the float control switch 38, so that the various circuits may be energized for the purpose of calibrating the flow rate of the water and medicament solution. With the test switch 47 closed, the individual electrical connector for the water solenoid valve 29 or the medicament pump 32 and solenoid valve 35 are connected for calibrating the flow rates individually. During normal operation, the water solenoid valve 29 is connected to the receptacle 39e, the medicament solenoid shut-off valve 35 is connected to the receptacle 39d, and the medicament pump is connected to the receptacle 39b. In this mode, with the power switch 46 closed, the operation of the apparatus is controlled by the float valve switch 38. As the demand for drinking water is indicated by the lowering of the float 38a, switch 38 is closed starting the medicament pump and opening the fluid shut-off valves 29 and 35. The elapsed time indicating clock 41 is automatically energized with the water solenoid valve 29, enabling a calculation to be made as to the total quantity of water supplied by knowing the calibrated flow rate of the water circuit.

If a type of treating solution is used which has insoluble particles, these particles may be held in suspension by running the medicament pump continuously to recirculate the concentrated solution within the reservoir 33 by merely connecting the pump electrically to the receptacle 39a.

Whenever it is desirable to cyclic treat the drinking water of certain animals, it is possible to control the injection of the medicament solution into the drinking water only at predetermined intervals by means of connecting the medicament shutoff valve 35 to the receptacle 39c. Thus, predetermined injection of the concentrated medicament solution on a cyclic basis is possible. The timing device 40 can be capable of any desirable range, such as 24 hours, 48 hours, 1 week or even 1 month, if desired.

OPERATION

Before initiating operation of the medicament mixing apparatus 10, a concentrated solution of the medicament or additive is prepared and introduced into the storage container 23. This solution is usually of a high concentration, so that only a small amount is necessary to be mixed with the water to obtain the desired proportion. Thus, a large quantity of final treating solution can be provided with a minimum of down time for the replenishment of the medicament concentrate. With the power switch and test switch 46, 47, respectively, closed, the connector to the water solenoid shut-off valve 29 is connected to the receptacle 39e. The water flow rate is calibrated and adjusted by measuring the amount of water entering the mixing chamber 22 for a given time. Graduation marks 44 in possibly gallon units can be provided on the inside of the chamber 22 to facilitate measurement of the water during the calibration procedure. After the water has been calibrated, the connector is removed from the receptacle 39e and the connectors for the medicament pump 32 and solenoid shut-off valve 35 are connected to the receptacles 39b and 39d, respectively.

If desired, instead of connecting and removing the individual connectors, a pair of three-way electrical switches may be inserted in the respective electrical circuit for the water and medicament. A test position on each switch can replace the test switch 47 and automatically start the clock 41 for each calibration.

The flow rate of the medicament is calibrated by collecting a timed flow from the medicament nozzle 37 in a graduated cylinder. Flow rate adjustments are made by metering valve 34 to obtain the proper proportion of medicament to the known flow rate of water. The calibrated flow rates in both circuits will remain essentially constant until readjusted. By opening the test switch 47, and reconnecting the water solenoid valve 29, medicament solenoid valve 35 and medicament pump 32 to receptacles 39e, 39d and 39b, respectively, the apparatus is ready for normal automatic operation.

During operation of the medicament mixing apparatus 10, the demand for drinking water is sensed by a remote device (not shown) located at the various watering areas. Upon indication of a demand for drinking water, the delivery pump 42 connected to the outline line 43 from the mixing chamber 22 is electrically energized. As the pump 42 is operated, the treating solution level within the chamber 22 is lowered, causing the flow control switch 38 to be energized. In normal operation, the clock, medicament pump 32, the medicament shut-off valve 35 and the water solenoid shut-off valve 29 are energized simultaneously, so as to inject the water and medicament solution into the mixing chamber 22, where it is instantaneously mixed before passing through the delivery outlet pipe 43.

If the cyclic preset timer is connected into the medicament circuit by connection of the solenoid valve 35 to receptacle 39c, injection of the medicament may not start simultaneously with the water solenoid valve operation, but would be delayed until such time as the timer 40 calls for medicament treatment.

While a medicament mixing apparatus has been shown and described in detail, it is obvious that this invention is not to be considered as being limited to the exact form disclosed and that changes in detailed construction may be made therein within the scope of the invention, without departing from the spirit thereof.

What is claimed is:

1. A liquid mixing apparatus for accurately proportioning additives into drinking water for animals, such as poultry, livestock and the like, said mixing apparatus comprising:
    a. support means;
    b. reservoir means for mixing and holding a water-additive solution mounted on said support means;
    c. water supply means for delivery of a quantity of water to said reservoir means at a predetermined rate;
    d. means for storing and injecting a quantity of additive to said reservoir at a predetermined rate proportionate to the flow rate of the water, said additive storing and injecting means includes a storage means for storing a prepared quantity of liquid additive solution mounted on said support means below said reservoir means so as to collect overflow from said reservoir means, pump means arranged for drawing the additive from the storage means and and adjustable regulator means connected to the output of said pump means whereby the predetermined flow rate of additive solution can be injected directly into the reservoir means, the output of said pump means further including a pressure by-pass means whereby the additive can be returned to the storage means when the pressure in the additive injecting means exceeds a predetermined pressure;
e. means connected to said reservoir means for distributing the solution to a watering area for said animals whenever a demand for drinking water exists; and
f. means for automatically controlling the flow of water and additive to said reservoir means for continuously mixing whenever the solution within the reservoir means is withdrawn below a predetermined level by said distributing means, said control means includes means for operating said pump means continuously when desired so that the prepared liquid additive when not injected into the mixing reservoir can be recirculated through the pressure by-pass means to maintain any insoluble particles within said additive in a state of suspension.

2. A liquid mixing apparatus as defined in claim 1 wherein said water supply means includes a pressure regulating means whereby a constant water flow rate to said water reservoir means is maintained.

3. A liquid mixing apparatus as defined in claim 1 wherein said pump means is a constant output pressure pump whereby the additive flow rate to said reservoir means may be maintained constant regardless of the liquid height within said storage means.

4. A liquid mixing apparatus as defined in claim 1 wherein said means for automatically controlling the flow of additive to said reservoir means includes a preset 24-hour timing means whereby the injection of additive into said reservoir means may be limited to predetermined time periods, and water may be withdrawn from said reservoir means for the remainder of the 24-hour period.

* * * * *

UNITED STATES PATENT OFFICE
CERTIFICATE OF CORRECTION

PATENT NO. : 3,870,076
DATED : March 11, 1975
INVENTOR(S) : Charles Graznak

It is certified that error appears in the above-identified patent and that said Letters Patent are hereby corrected as shown below:

Column 4, line 48, change "tow" to --two--.

Signed and sealed this 6th day of May 1975.

(SEAL)
Attest:

RUTH C. MASON
Attesting Officer

C. MARSHALL DANN
Commissioner of Patents
and Trademarks